INVENTORS
Roger M. Lhermitte
Kenneth H. Shreeve
Robert J. Erdahl

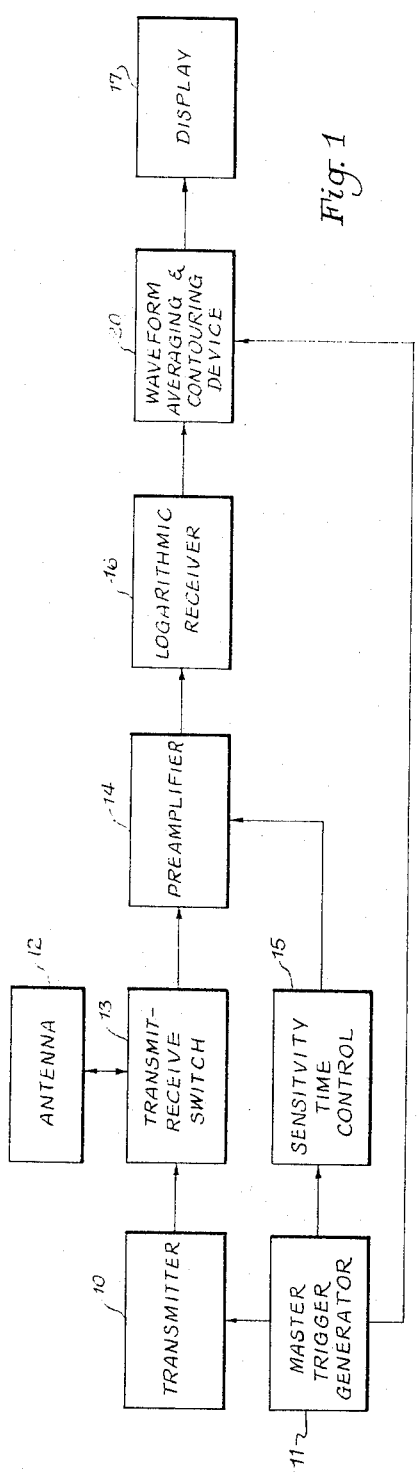
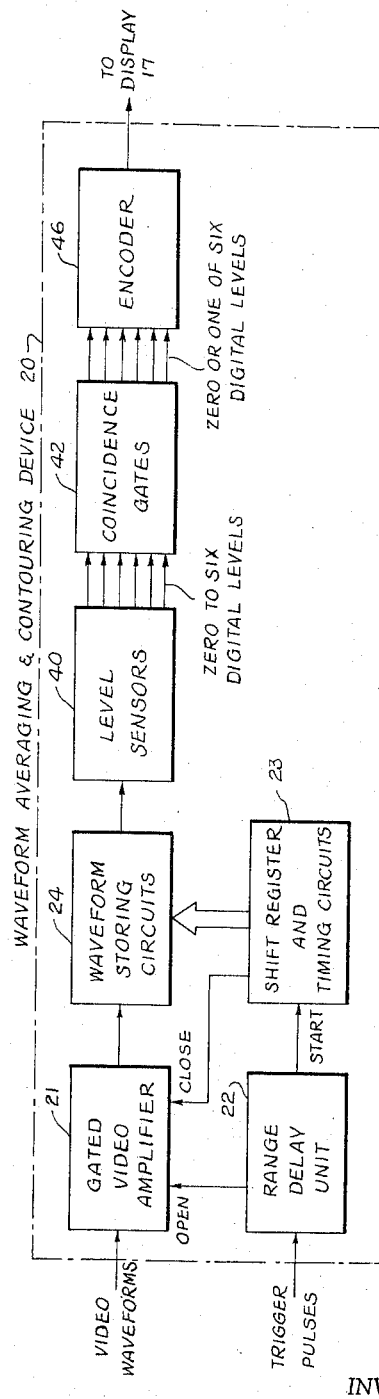

BY

AGENT

United States Patent Office 3,366,951
Patented Jan. 30, 1968

3,366,951
WAVEFORM AVERAGING AND CONTOURING DEVICE FOR WEATHER RADARS AND THE LIKE
Roger M. Lhermitte, Norman, Okla., Kenneth H. Shreeve, Silver Spring, Md., and Robert J. Erdahl, Annandale, Va., assignors to the United States of America as represented by the Secretary of Commerce
Filed Apr. 4, 1967, Ser. No. 628,509
3 Claims. (Cl. 343—5)

ABSTRACT OF THE DISCLOSURE

Successive weather radar video waveforms are averaged by storing timed increments in a capacitor bank, and simultaneously reading the bank contents. Each capacitor is charged unidirectionally through a transistor switch, and is partially discharged between charging cycles. The bank output is level sensed and encoded to provide either a three-shade, two-cycle contoured PPI display, or a white-on-black display of selected bands of the contour map.

Field of the invention

This invention relates to devices for contouring radar displays, and more particularly to a device for averaging successive radar video waveforms and contour mapping the resultant signals.

Description of the prior art

Prior art devices for contouring radar displays typically alternate the radar display beam between black and white levels as the instaneous video signal traverses predetermined thresholds or crossover points. As is well known, the resultant black and white display bands have ragged edges when successive video waveforms contain random fluctuations due, for example, to precipitation. In addition, the pattern of alternate black and white bands is easily misinterpreted, in that a change from black to white display (or vice versa) may result from either an increase or decrease in echo intensity.

Summary of the invention

The present invention avoids the ragged display bands of the prior art devices, by operating on an averaged video waveform, rather than on each individual waveform. The present invention also presents an improved contoured display, by generating more than two display shades, so that the shades associated with an increase and a decrease, respectively, form a given display shade are different. An additional feature of the present invention permits the operator to display selected display bands in a white-on-black format.

Brief description of the drawing

FIG. 1 is a block diagram of a radar system employing the waveform averaging and contouring device of this invention;

FIG. 2 is a block diagram of the waveform averaging and contouring device;

Description of the preferred embodiment

Figure 3:
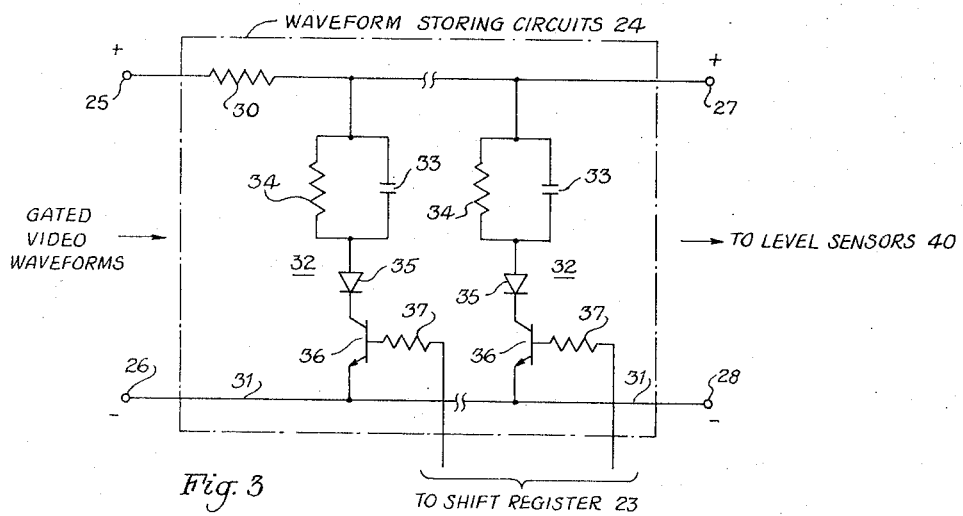
FIG. 3 is a circuit diagram of the waveform storing circuits of the device.

FIG. 1 shows the waveform averaging and contouring device of this invention incorporated into a weather radar system, although it will be apparent that the device may also be used in sonar or lidar systems. The weather radar of FIG. 1 comprises a transmitter 10, which is periodically triggered by a master trigger generator 11 to send a pulse of high frequency radio waves to a slowly-rotating antenna 12, via a transmit-receive switch 13. The antenna 12 also receives the radio waves reflected by precipitation targets, and the transmit-receive switch 13 passes these signals to a preamplifier 14. The gain of the preamplifier 14 is controlled by a sensitivity time control circuit 15, triggered by the master trigger generator 11, to compensate for the attenuation of distant target signals. The preamplifier 14 is connected to a receiver 16, preferably logarithmic in response, where the signals are heterodyned and detected, to provide the video waveforms which normally are fed to a display unit 17 that is synchronized with antenna 12. In accordance with this invention, there is interposed between the receiver 16 and display unit 17 the waveform averaging and contouring device 20. The device 20 also receives the trigger pulses of the master trigger generator 11.

As shown in FIG. 2, the video waveforms are gated and amplified in a gated video amplifier 21. The trigger pulses operate a range delay unit 22 which opens the gate after sufficient time delay to blank out the nearby ground clutter in the video waveforms. The range delay unit 22 also starts a shift register and timing circuits 23 which close the gated amplifier 21 at the end of each receiving period. The gated video waveforms are applied to the waveform storing circuits 24, which are shown in detail in FIG. 3.

The waveform storing circuits 24 of FIG. 3 include input terminals 25, 26 and output terminals 27, 28. A resistor 30 is connected between input terminal 25 and output terminal 27, while input terminal 26 and output terminal 28 are connected together by a conductor 31. A large plurality of identical circuits 32, generally about 100 in number are connected in parallel across the output terminals 27 and 28. Each of these circuits 32 comprises a capacitor 33 shunted with a resistor 34 and connected in series with a diode 35 and the collector-emitter circuit of a switching transistor 36. The diode 35 is poled to prevent the collector from being forward biased. The base of each transistor 36 is connected via a current-limiting resistor 37 to a respective stage of the shift register 23. The shift register is stepped by timing circuits that are gated "on" by the range delay unit 22, FIG. 2, and inhibited by the last stage of the register, in timed coincidence with the end of the radar receiving period. Thus, when the range delay unit produces a "start" signal, each of the transistors 36 is turned "on" and then "off" in sequential order, once during each receiving period.

In the operation of the waveform storing circuits 24 of FIG. 3, when a transistor 36 is turned "on," the capacitor 33 associated with that transistor charges towards the waveform voltage, through the resistor 30. The charging time constant of the resistor 30 and capacitor 33 preferably is many times greater than the "on" time increment, so that the capacitor attains only a small fraction of the waveform voltage. When the transistor subsequently is turned "off," the charge on the capacitor is slowly discharged by the shunt resistor 34. The value of resistor 34 is selected so that the discharge time constant is many times greater than the "off" period (the period between the radar triggers) so that only a small fraction of the charge stored on the capacitor is discharged. (In general, resistor 34 is very much larger than the charging resistor 30, so the effect of resistor 34 during the charging cycle may be neglected.) In this manner, the voltage across the capacitor 33 is a sawtooth having fixed charge and discharge times, and a variable supply voltage, namely, the voltage of the gated video waveforms during the "on" times. Consequently, the peak voltage (or charge) on the capacitor 33 is proportional to the average value of the variable supply voltage, whereby the rapid, random waveform fluctuations produced by the fluctuating distribution of precipitation targets are averaged to zero on the storage capacitors 33.

The output terminals 27, 28 of FIG. 3 "see" the voltage on a capacitor 33 only when the transistor 36 associated therewith is turned "on." In the "off" condition, the transistor is essentially an open circuit and isolates the capacitor from the output terminal 28. (The diode 35 prevents the voltage stored on the capacitor from forward biasing the collector-base circuit when the transistor 36 is turned "off.") Accordingly, the output waveform consists of the sequence of charging cycles of the capacitors 33 produced by turning "on" the transistors 36 in sequence. Since, as explained above, each charging cycle is proportional to the average value of the waveform during the associated "on" time, the complete output waveform at terminals 27, 28 corresponds to an average of the previous waveforms applied to the input terminals 25, 26. The output waveform is finely-toothed due to the multiplicity of the charging waveforms that comprise the output waveform, and hence the output waveform is an approximation to the average of the input waveforms. By using a large number of storage circuits 32 (e.g., 100) the approximation may be made very good, to the extent desired.

The output waveform is applied to a plurality of level sensors 40, FIG. 2. These sensors have their inputs connected in parallel, and have increasingly higher thresholds. Thus, when the average waveform amplitude is below the first threshold, there is no output signal on the output lines of the sensors 40; when the waveform amplitude is between the first and second thresholds, there is one output signal; and so forth. FIG. 2 illustrates the case of six sensors, which can produce zero to six signals or digital levels. These are fed to the coincidence gates 42, which are shown in detail in FIG. 4.

Figure 4:
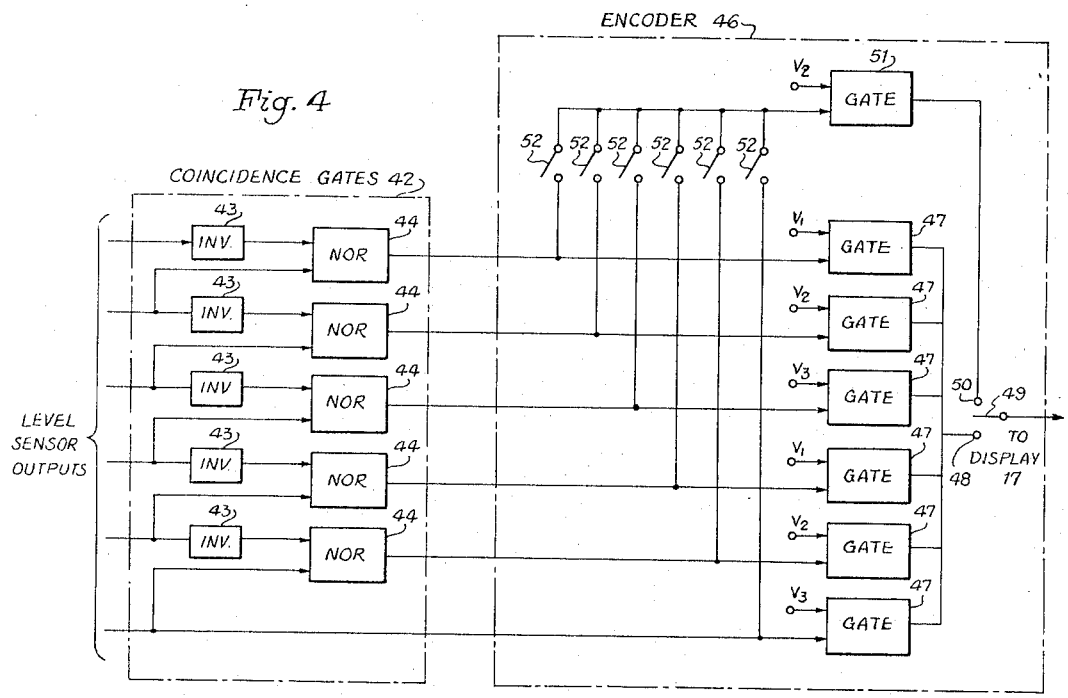
FIG. 4 is a block diagram of the coincidence gates and the encoder of the device.

In FIG. 4, the first five level sensor outputs are each connected to an inverter 43 that in turn is connected to a nor gate 44. The second through sixth level sensor outputs are each connected to a respective one of the five nor gates 44. The nor gates produce output signals only when both inputs are not positive. Therefore, when all of the level sensor outputs are low, or negative, the nor gates 44 have positive (inverted negative) signals on their upper terminals, and negative signals on their lower terminals. In this condition, there are no outputs from the nor gates. When the first level sensor goes positive, the upper terminal of the first nor gate goes negative, and the nor gate produces an output. When the second level sensor goes positive, the lower terminal of the first nor gate goes positive, and shuts down the gate, while the upper terminal of the second nor gate goes negative, causing the second gate to produce an output. Each level sensor signal thus activates its associated nor gate, and deactivates the nor gate associated with the preceding level sensor, so that only the nor gate associated with the highest level at any instant will provide an output. In FIG. 4, the sixth level sensor output line does not have a nor gate, because there is no higher level to deactivate this signal; in the absence of the nor gate, no inverter is required.

As shown in FIGS. 2 and 4, the coincidence gates 42 are connected to an encoder 46. Each nor gate 44 output is connected to a respective gate 47. The first and fourth gates 47 are arranged to gate a fixed voltage $V_1$; the second and fifth gates 47 gate a fixed voltage $V_2$; and the third and sixth gates 47 gate a fixed voltage $V_3$. The gates 47 are connected to a switch contact 48 which can be engaged by a switch arm 49 connected to the display unit 17 (FIG. 1). When arm 49 is thrown to contact 48 and the voltage $V_1$ is gated to the display unit 17, the display is gray. When voltage $V_2$ is gated, the display is white, and when voltage $V_3$ is gated the display is black. Thus, when the waveform input to the level sensors 40 of FIG. 2 is below the first threshold, the display is black, and when the waveform increases in amplitude through the six thresholds, the display changes to gray, white, black, gray, white and black, respectively. Such a display format comprises a three-shade, two-cycle display. This format is much easier to interpret than the prior art two-shade formats. In a two-shade display, a change from black to white (or vice versa) occurs when the waveform amplitude exceeds the next higher threshold, or when the amplitude falls below the preceding threshold. This ambiguity is avoided in the present invention, where the transition through the next higher threshold would change the display from black to gray, while the transition through the preceding threshold would change the display from black to white.

It is to be understood that the present invention is not limited to the described six thresholds and three-shade, two-cycle display. For example, a four-shade display may be provided by supplying the gates 47, FIG. 4, with four appropriate voltages $V_1$–$V_4$. In this example, it might be desired to establish four thresholds, resulting in a four-shade, one-cycle display; or twelve thresholds, resulting in a four-shade, three-cycle display.

In the encoder 46 of FIG. 4, the switch arm 49 may alternatively be thrown to contact 50, which receives the voltage $V_2$ (white display) gated by an additional gate 51. The input of gate 51 is selectively connected through switches 52 to each of the outputs of the coincidence gates 42. In operation, when the switch 52 associated with, say, the third output line is closed (all other switches 52 being opened), the display 17 is white only when the waveform applied to the level sensors 40 exceeds the third threshold but not the fourth threshold. If the switch 52 associated with the fourth output line of the coincidence gates 42 is also closed, the display will show in white-on-black only those portions of the waveform lying between the third and fifth thresholds. In this manner, the switches 52 may selectively be closed to display only selected amplitude ranges of the averaged video waveforms. This feature is especially useful in resolving any doubts about the normal three-shade, two-cycle display, and in positively checking for the presence of high amplitude signals in a "mixed" display.

While the present invention has been described with reference to a single preferred embodiment, it is to be understood that the invention covers all such embodiments as fall within the scope and meaning of the appended claims.

We claim:
1. A device for averaging successive radar video waveforms and contour mapping the resultant waveform comprising:
   a pair of input terminals for receiving said video waveforms,
   a pair of output terminals,
   a resistor connected between one of said input terminals and one of said output terminals, the other of said input and output terminals being connected together,
   a plurality of identical circuits connected in parallel across said output terminals, each of said circuits comprising a capacitor shunted with a resistor and connected in series with a diode and the collector-emitter circuit of a switching transistor, said diode being poled to prevent the collector-base circuit of said transistor from being forward biased,
   means for turning each of said transistors "on" and then "off" in sequence once during each waveform period,
   a plurality of level sensors having increasingly higher thresholds connected in parallel across said output terminals,
   a plurality of coincidence gates each connected to a respective level sensor output and arranged so that a signal is produced only by the coincidence gate associated with the highest level sensed at any given time, a plurality of further gates each connected to a respective coincidence gate output, and at least three different fixed voltages arranged to be gated by said further gates to a radar display unit to provide at least a three-shade, one-cycle contoured display of the averaged waveform.

2. A device as set forth in claim 1, wherein said coincidence gates connected to all but the highest threshold sensor each comprises an inverter connected to a nor gate, each of said nor gates also having the output of the next higher threshold sensor connected to the input thereof.

3. A device as set forth in claim 1, wherein each of said coincidence gate outputs is selectively connected through a switch to an additional gate arranged to gate a fixed voltage to said radar display unit, so as to provide a contour map of selected waveform amplitude ranges, as selected by said switches.

No references cited.

RODNEY D. BENNETT, *Primary Examiner.*

C. L. WHITHAM, *Assistant Examiner.*